(12) United States Patent
Tucker et al.

(10) Patent No.: US 9,781,450 B2
(45) Date of Patent: Oct. 3, 2017

(54) SIMULTANEOUS ENCODING AND SENDING OF A VIDEO DATA FILE

(71) Applicant: Quixel Holdings Limited, Manchester (GB)

(72) Inventors: Robin Francis Tucker, London (GB); Florian Alexandru Sima, Prahova County (RO); Constantin Dumitrescu, Bucharest (RO)

(73) Assignee: QUIXEL HOLDINGS LIMITED, Manchester (GB)

( * ) Notice: Subject to any disclaimer, the term of this patent is extended or adjusted under 35 U.S.C. 154(b) by 10 days.

(21) Appl. No.: 14/399,889

(22) PCT Filed: Jun. 27, 2013

(86) PCT No.: PCT/GB2013/051708
§ 371 (c)(1),
(2) Date: Nov. 7, 2014

(87) PCT Pub. No.: WO2014/006375
PCT Pub. Date: Jan. 9, 2014

(65) Prior Publication Data
US 2015/0110202 A1    Apr. 23, 2015

(30) Foreign Application Priority Data
Jul. 5, 2012 (GB) .................................. 1211981.4

(51) Int. Cl.
*H04L 29/08* (2006.01)
*H04N 19/85* (2014.01)
(Continued)

(52) U.S. Cl.
CPC ........... *H04N 19/85* (2014.11); *H04L 65/602* (2013.01); *H04L 65/607* (2013.01); *H04L 67/06* (2013.01);
(Continued)

(58) Field of Classification Search
CPC ..... H04L 65/602; H04L 65/607; H04L 67/06; H04L 69/22; H04N 19/85; H04N 21/2187;
(Continued)

(56) References Cited

U.S. PATENT DOCUMENTS

| 5,646,941 A * | 7/1997 | Nishimura ........ H04L 12/40058 |
| | | 348/E5.114 |
| 6,580,756 B1 * | 6/2003 | Matsui ................... H04L 29/06 |
| | | 375/240.08 |

(Continued)

FOREIGN PATENT DOCUMENTS

| EP | 2150059 A1 | 2/2010 |
| WO | 2009017340 A1 | 2/2009 |

(Continued)

OTHER PUBLICATIONS

International Search Report issued in corresponding International Application No. PCT/GB2013/051708, dated Sep. 23, 2013.
(Continued)

*Primary Examiner* — Deirdre Beasley
(74) *Attorney, Agent, or Firm* — Morris & Kamlay LLP

(57) ABSTRACT

A method of encoding and communicating video data comprises encoding a video data file (22) to create an encoded video data file (24) and sending the encoded video data file (24) to a destination (30). A portion of the encoded video data file (24) is sent to the destination (30) at the same time as the video data file (22) is being encoded. New header information for the encoded video data file (44) is sent to the destination (30) when sending the encoded video data file to the destination is complete. The destination (30) can then modify a header (46) of the encoded video data file (44) to
(Continued)

include the new header information. This reduces the overall time taken for the video data file to be encoded and sent to the destination (30).

29 Claims, 6 Drawing Sheets

(51) Int. Cl.
| | |
|---|---|
| *H04N 21/2343* | (2011.01) |
| *H04N 21/845* | (2011.01) |
| *H04N 21/854* | (2011.01) |
| *H04L 29/06* | (2006.01) |
| *H04N 21/2187* | (2011.01) |

(52) U.S. Cl.
CPC ......... *H04L 69/22* (2013.01); *H04N 21/2187* (2013.01); *H04N 21/234309* (2013.01); *H04N 21/8456* (2013.01); *H04N 21/85406* (2013.01)

(58) Field of Classification Search
CPC ....... H04N 21/234309; H04N 21/8456; H04N 21/85406
USPC .................................... 375/240.26
See application file for complete search history.

(56) References Cited

U.S. PATENT DOCUMENTS

| | | | | |
|---|---|---|---|---|
| 7,430,261 | B2* | 9/2008 | Forest .................. | H03M 13/43 370/392 |
| 8,533,166 | B1* | 9/2013 | Sulieman ............... | H04L 69/04 375/240 |
| 2002/0048323 | A1* | 4/2002 | Kang ..................... | H04N 19/30 375/240.27 |
| 2002/0172277 | A1* | 11/2002 | Choi ..................... | H04L 1/0041 375/240.01 |
| 2003/0067627 | A1* | 4/2003 | Ishikawa ............ | H04N 1/32128 358/1.15 |
| 2003/0091054 | A1* | 5/2003 | Futenma ................ | H04L 29/06 370/395.42 |
| 2003/0093810 | A1* | 5/2003 | Taniguchi ........ | G08B 13/19656 725/112 |
| 2003/0128699 | A1 | 7/2003 | Reams | |
| 2004/0031054 | A1* | 2/2004 | Dankworth ....... | H04L 29/06027 725/86 |
| 2004/0240541 | A1* | 12/2004 | Chadwick ............ | H04N 21/231 375/240.01 |
| 2005/0004937 | A1 | 1/2005 | Colarika | |
| 2005/0190872 | A1* | 9/2005 | Seong .............. | H04N 21/23608 375/354 |
| 2007/0172120 | A1* | 7/2007 | Roimela .................. | G06T 9/00 382/166 |
| 2007/0206676 | A1* | 9/2007 | Yamazaki ............ | G11B 27/034 375/240.12 |
| 2009/0144596 | A1* | 6/2009 | Mohan ................... | G11B 20/18 714/746 |
| 2010/0020869 | A1* | 1/2010 | Ikeda ................... | H04N 19/176 375/240.03 |
| 2010/0066915 | A1* | 3/2010 | Mori .................... | G11B 27/105 348/714 |
| 2010/0226443 | A1* | 9/2010 | Citta .............. | H04N 21/234327 375/240.26 |
| 2011/0022684 | A1* | 1/2011 | Nakao ..................... | H04L 67/06 709/219 |
| 2011/0164689 | A1* | 7/2011 | De Neve .......... | H04N 21/23106 375/240.25 |
| 2012/0038782 | A1* | 2/2012 | Messmer ............. | H04N 19/467 348/207.1 |
| 2012/0054370 | A1 | 3/2012 | Tsubakihara | |
| 2012/0177048 | A1* | 7/2012 | Tanaka .................... | H04L 45/74 370/392 |
| 2012/0268298 | A1* | 10/2012 | Oh ...................... | H03M 7/6088 341/87 |
| 2013/0004146 | A1* | 1/2013 | Kaneko ................. | H04N 19/46 386/353 |

FOREIGN PATENT DOCUMENTS

| | | |
|---|---|---|
| WO | 2009017340 A2 | 2/2009 |
| WO | 2009046354 A1 | 4/2009 |

OTHER PUBLICATIONS

Combined Search and Examination Report under Sections 17 & 18(3) in corresponding GB Application No. GB1211981.4, dated Jul. 7, 2014.
Examination Report under Section 18(3) in corresponding GB Application No. GB1211981.4, dated Aug. 21, 2014.
Notification of Grant in corresponding GB Application No. GB1211981.4, dated Sep. 16, 2014.
International Search Report issued in corresponding International Application No. PCT/GB2013/051708 dated Sep. 23, 2013.
Maxim Levkov: "Understanding the MPEG-4 movie atom | Adobe Developer Connection", Oct. 18, 2010 (Oct. 18, 2010), XP055301461, Retrieved from the Internet: URL:http://www.adobe.com/devnet/video/articles/mp4_movie_atom.html.
Combined Search and Examination Report dated Jan. 7, 2015 in corresponding GB Application No. 1211981.4.

* cited by examiner

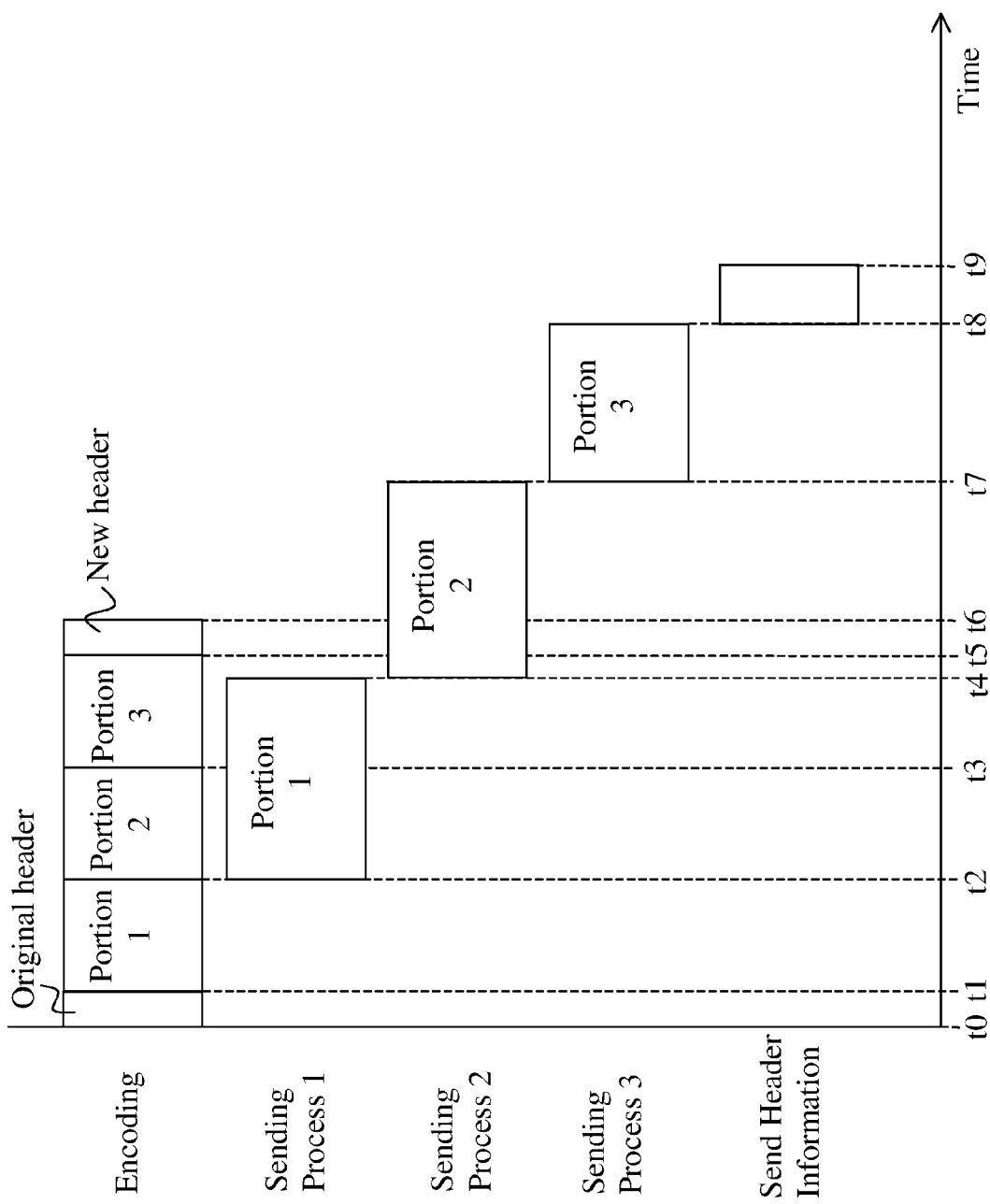

SIMULTANEOUS ENCODING AND SENDING OF A VIDEO DATA FILE

The present invention relates to the communication of video data. In particular, the present invention relates to the simultaneous encoding and sending of a video data file.

The advent of digital video cameras and the Internet has revolutionised the distribution of motion pictures. Traditional methods of distributing motion pictures involve creating a motion picture on an analogue medium (such as photographic film or videotape) and transporting the medium to its destination. A disadvantage of these traditional methods is that it can take a long time for a physical medium to reach its destination. Nowadays, the time taken to distribute a motion picture can be reduced by creating the motion picture in a digital format, and sending digital video data to its destination via a communication network such as the Internet. Video sharing services, such as YouTube™ (www.youtube.com), operate in this manner.

However, even with modern digital technology, the time taken to distribute very high quality videos can be unacceptably long. Professional digital video cameras typically create videos in formats that use little or no compression, in order to avoid the quality of the videos being degraded by compression. The disadvantage of using little or no compression is that the video data files are usually very large, such that a long time can be taken to send such files to their destination, even with a fast communication network. It is possible to encode the video data using a compressed format in order to reduce the time taken to send a video data file to its destination. However, it can take a long time to encode the video data due to the large number of calculations that video compression algorithms require.

Thus, there is a need for a faster way to distribute video data.

WO 2009/046354 relates to the simultaneous uploading and streaming of media. A video file is stored on a video source, and a transcoding process transcodes the video data into a streaming media format such as Adobe™ Flash™ (.flv) or RealMedia™ (.rm). The video file is read into memory block-by-block, the block is transcoded and the transcoded block is stored in a temporary file on the video source. The video transcoding thread operates in parallel with a second thread that manages video uploading to a video server. Viewers can watch the streaming video whilst it is being uploaded to the video server.

However, the arrangement disclosed by WO 2009/046354 is only suitable for uploading video files whilst they are being transcoded to particular streaming media formats, such as Adobe™ Flash™, in which the transcoding process causes the transcoded data to be output in a completely linear manner. The arrangement disclosed by WO 2009/046354 is not suitable for uploading video files whilst they are being encoded to media formats whose encoding processes cause encoded data to be output in a non-linear manner. For example, the process of encoding data in the H.264/MPEG-4 AVC format can be said to be non-linear, because a file header is written at the start of the encoding process and then replaced with a new header at the end of the encoding process.

Other methods of encoding and sending live video and streaming video exist, but these methods are not suitable for encoding and sending a file of video data. File-based encoding and data transfer involve technical considerations that do not arise when encoding and sending live video and streaming video.

There is a need to reduce the time taken to encode a video data file and to send the encoded video data to a destination. Furthermore, it should be possible to encode the video data file to media formats whose encoding processes cause encoded data to be output in a non-linear manner.

A first aspect provides a method of encoding and communicating video data, comprising: encoding a video data file to create an encoded video data file; sending the encoded video data file to a destination, wherein a portion of the encoded video data file is sent to the destination at the same time as the video data file is being encoded; and sending new header information for the encoded video data file to the destination when sending the encoded video data file to the destination is complete.

This reduces the overall time taken for the video data file to be encoded and sent to the destination. More specifically, sending new header information to the destination after the encoded video data file has been completely sent to the destination allows sending and encoding to occur simultaneously, thereby avoiding the need to wait for the video data file to be completely encoded before sending can take place. Otherwise, if the encoding process were to cause encoded data to be output in a non-linear manner (as described above), it would be necessary to wait for all of the video data file to be encoded and for the header to be replaced with a new header before any data could be sent to the destination, which would result in a significant delay.

Sending new header information preferably comprises causing the destination to modify the encoded video data file to include the new header information. After it has been modified to include the new header information, the encoded video data file at the destination (referred to herein as the "target file") will contain the information needed for the target file to be playable. By causing the destination to modify the target file, the need to wait for the header to be replaced with a new header can be avoided. For example, code at the destination may be invoked remotely by the source of the encoded video data file in order to cause the destination to modify the encoded video file.

Encoding the video data file to create an encoded video data file preferably comprises: generating an original header; writing the original header to the encoded video data file; writing encoded video data to the encoded video data file; generating a new header comprising the new header information; and replacing the original header of the encoded video data file with the new header. Sending the encoded video data file to a destination may comprise sending the original header to the destination with a first portion of the encoded video data file.

Sending new header information for the encoded video data file to the destination preferably comprises converting the new header to a character-encoded format to create a character-encoded header and sending the character-encoded header to the destination. By converting the header to a character-encoded format, the header can be sent to the destination using hypertext transfer protocol (HTTP). This is an efficient way to communicate the data needed to modify the header to the destination.

The method preferably further comprises: receiving the character-encoded header at the destination; creating a binary header by converting the character-encoded header to binary; and replacing a header of the encoded video data file at the destination with the binary header. By receiving the header in a character-encoded format, the header can be received at the destination using HTTP. This is an efficient way to communicate the data needed to modify the header to the destination.

The encoded video data file preferably comprises a plurality of portions and sending the encoded video data file preferably comprises sending each portion of the encoded video data file to the destination in a separate communication session. Sending each portion of the encoded video data file in a separate communication session helps to ensure that the content of the encoded video data file that is received at the destination is identical to the content of the encoded video data file at the source, even though the content of the encoded video data file at the source changes continuously whilst it is being encoded.

Each communication session preferably uses a communication protocol having functionality to append data to a file that was sent during an earlier communication session. The need for a specialised application to combine each of the portions of the encoded video data file that are sent separately to the destination is avoided by using in-built functionality provided by the communication protocol. The communication protocol is preferably file transfer protocol (FTP).

Sending the encoded video data file preferably comprises: determining that a portion of the video data file has been encoded; and triggering a process to send a corresponding portion of the encoded video data file to the destination. Triggering a process to send a portion of the encoded video data file to the destination as soon it has been encoded can reduce the likelihood of the communication link between the source and destination being idle. This can improve the utilisation of the communication link and can consequently reduce the time taken to send the encoded video data file to the destination.

A further aspect provides a method of communicating video data, comprising: receiving an encoded video data file; receiving new header information for the encoded video data file when the encoded video data file has been completely received; and modifying the encoded video data file to include the new header information.

Receiving new header information preferably comprises receiving a character-encoded header. Modifying the encoded video data file preferably comprises: creating a binary header by converting the character-encoded header to binary; and replacing a header of the encoded video data file with the binary header. The encoded video data file preferably comprises an original header when it is received. The original header is preferably replaced by the binary header. The encoded video data file preferably comprises a plurality of portions, and receiving the encoded video data file preferably comprises receiving each portion of the encoded video data file in a separate communication session. Each communication session preferably uses a communication protocol having functionality to append data to a file that was received during an earlier communication session. Receiving the encoded video data file preferably comprises appending a received portion of the encoded video data file to a portion of the encoded video data file that was received during an earlier communication session.

A further aspect provides a processor-readable medium comprising instructions which, when executed by a processor, cause the processor to perform a method as described herein.

A further aspect provides an apparatus for encoding and communicating video data, comprising: means for encoding a video data file to create an encoded video data file; means for sending the encoded video data file to a destination, wherein the means for sending the encoded video data is operable to send a portion of the encoded video data file to the destination at the same time as the means for encoding is encoding the video data file; and means for sending new header information for the encoded video data file to the destination, wherein the means for sending new header information is operable to send the new header information when the means for sending the encoded video data has finished sending the encoded video data file.

The means for sending new header information is preferably operable to cause the destination to modify the encoded video data file to include the new header information. The means for encoding the video data file is preferably operable to: generate an original header; write the original header to the encoded video data file; write encoded video data to the encoded video data file; generate a new header comprising the new header information; and replace the original header of the encoded video data file with the new header.

The apparatus preferably further comprises: means for converting the new header to a character-encoded format to create a character-encoded header; and means for sending the character-encoded header to the destination. The apparatus preferably further comprises: means for receiving the character-encoded header at the destination; means for creating a binary header by converting the character-encoded header to binary; and means for replacing a header of the encoded video data file at the destination with the binary header. The encoded video data file preferably comprises a plurality of portions, and the means for sending the encoded video data file preferably comprises means for sending each portion of the encoded video data file to the destination in a separate communication session. Each communication session preferably uses a communication protocol having functionality to append data to a file that was sent during an earlier communication session. The means for sending the encoded video data file preferably comprises: means for determining that a portion of the video data file has been encoded; and means for triggering a process to send a corresponding portion of the encoded video data file to the destination.

A further aspect provides an apparatus for communicating video data, comprising: means for receiving an encoded video data file; means for receiving new header information for the encoded video data file when the encoded video data file has been completely received; and means for modifying the encoded video data file to include the new header information.

The means for receiving new header information is preferably operable to receive a character-encoded header. The means for modifying the encoded video data file preferably comprises: means for creating a binary header by converting the character-encoded header to binary; and means for replacing a header of the encoded video data file with the binary header. The encoded video data file preferably comprises a plurality of portions, and wherein the means for receiving the encoded video data file is preferably operable to receive each portion of the encoded video data file in a separate communication session. Each communication session preferably uses a communication protocol having functionality to append data to a file that was received during an earlier communication session. The means for receiving the encoded video data file preferably comprises means for appending a received portion of the encoded video data file to a portion of the encoded video data file that was received during an earlier communication session.

BRIEF DESCRIPTION OF THE DRAWINGS

Preferred features of the invention will now be described, purely by way of example, with reference to the accompanying drawings, wherein like elements are indicated using like reference signs, and in which:

FIG. 6 is a timing diagram of the method of encoding and sending a video file shown in FIG. 2.

DETAILED DESCRIPTION

Figure 1:
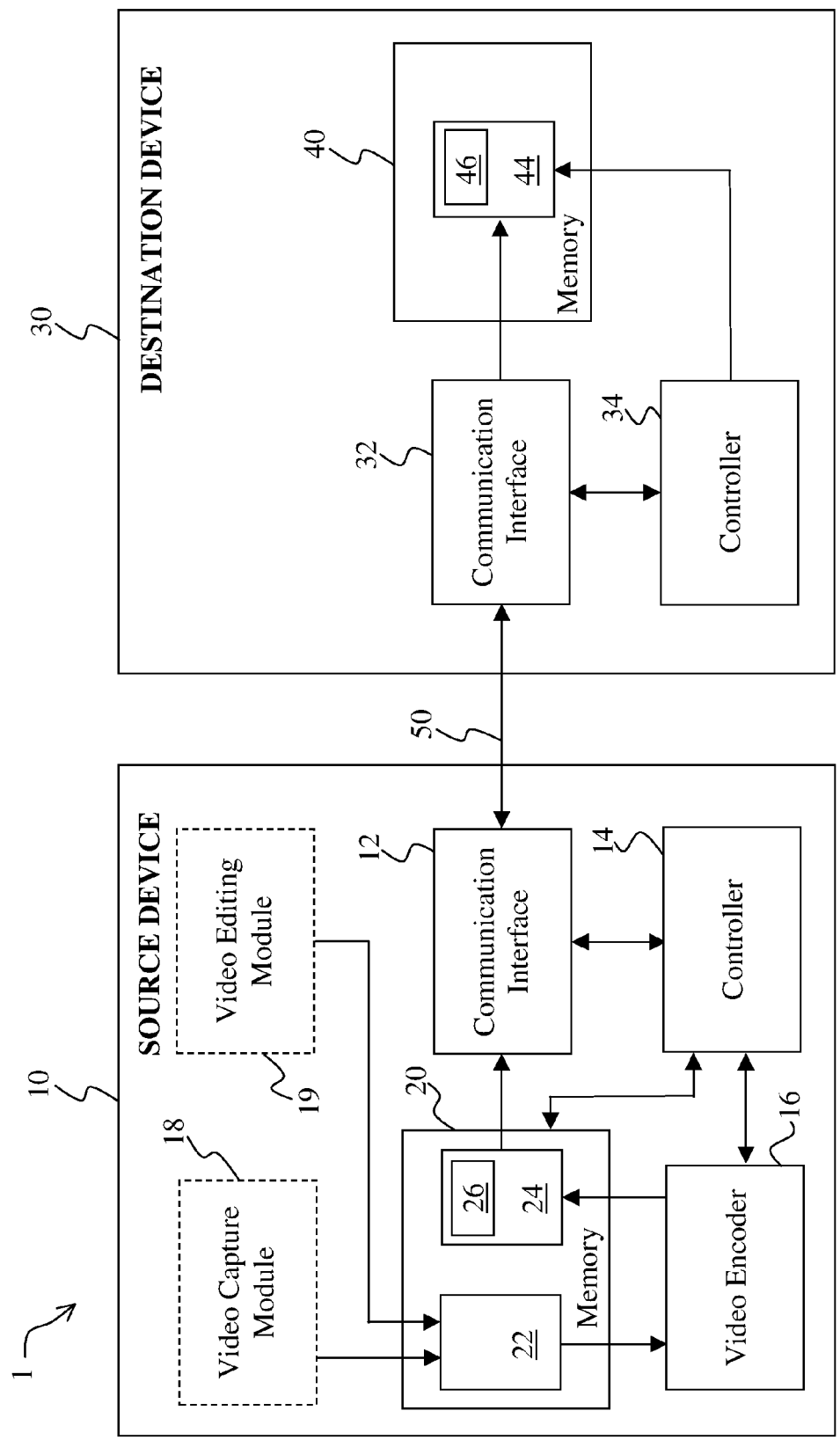
FIG. 1 is a schematic diagram of a system for encoding and communicating a video data file.

FIG. 1 is a flow diagram of a system 1 for communicating video data. The system 1 comprises a source device 10 and a destination device 30. The source device 10 comprises a communication interface 12, a controller 14, a video encoder 16 and memory 20. The destination device 30 comprises a communication interface 32, a controller 34, a video encoder 36 and memory 40.

The communication interfaces 12, 32 are both operable to send and receive data via a communication link 50. The communication interfaces 12, 32 thereby cooperate to allow data to be exchanged between the source device 10 and the destination device 30 via the communication link 50. Examples of communication interfaces 12, 32 may include a network interface (such as an Ethernet card), a communication port or a modem. The communication link 50 may comprise any type of wired or wireless communication technology, or any combination of different wired and/or wireless communication technologies. For example, the communication link 50 may comprise a short range wired communication link, such as a bus for connecting the source device 10 directly to the destination device 30. As another example, the communication link 50 may comprise a short-range wireless communication link, such as a Bluetooth™ or IEEE 802.11 (Wi-Fi™) link. As yet another example, the communication link 50 may comprise a wide area network (WAN), such as the Internet or a cellular telephone network. The communication link 50 may comprise any other suitable electronic, electromagnetic or optical communication technologies.

The controllers 14, 34 are operable to control the operation of the source device 10 and target device 30 respectively, so as to perform the methods that are described below with reference to FIGS. 2 to 5. For example, the controllers 14, 34 may each comprise one or more processors that are programmed with instructions. Alternatively or additionally, the controllers 14, 34 may comprise an application specific integrated circuit (ASIC), or even appropriately connected discrete logic gates.

Memory 20, 40 is operable to store data, particularly video data. Data can be written to and/or read from memory 20, 40 by other components of the source device 10 or destination device 30, such as by the respective communication interface 12, 32 or controller 14, 34. The memory 20 of the source device 10 is operable to store an input file 22 of video data and an encoded file 24 of video data, whilst the memory 40 of the destination device 30 is operable to store a target file 44 of video data. The data stored by memory 20, 40 may also include instructions that can be executed by a respective controller 14, 34. Each memory 20, 40 may comprise a volatile or non-volatile data storage technology, or any combination thereof. For example, memory 20, 40 may comprise random access memory (RAM), a hard disk drive and/or a removable storage device. For example, the removable storage device may comprise a memory card (e.g. a Secure Digital™ card or other solid state memory device), an optical disc, a magnetic disk or a magnetic tape. Thus, the term "memory" as used herein should be construed broadly, and is not intended to be limited to any particular type of data storage technology.

The video encoder 16 is operable to encode a video data file. The term "encode" as used herein is preferably understood to refer to a process by which video data is converted from one format to another format. The video encoder 16 is operable to receive video data from an input file 22, to encode the video data using an encoding algorithm, and to output the resulting encoded video data to an encoded file 24. Suitable encoding algorithms are known to those skilled in the art and so need not be described in detail herein. The video encoder 16 may be implemented using software, using specialised video encoding hardware, or using a combination of software and specialised hardware.

It will be appreciated that the video data in the input file 22 may comprise some form of encoding. Thus, the term "encode" as used herein is preferably understood to encompass transcoding processes by which video data is converted from one encoded format to a different encoded format. The system and methods disclosed herein are preferably capable of converting video data from any suitable format to any other suitable format. However, as will be described in more detail below, the system and methods disclosed herein are particularly suitable for encoding and sending video data formats whose encoding processes cause encoded data to be output in a non-linear manner. Purely by way of example, the input file 22 may be in XDCAM format, and the encoded file 24 may be in H.264/MPEG-4 AVC format.

Optionally, the source device 10 may also comprise a video capture module 18 and/or a video editing module 19. The video capture module 18 and video editing module 19 can both be operable to create the input file 22. The video capture module 18 may comprise a digital camera. The video editing module 19 may comprise any combination of hardware and/or software that is operable to edit an existing video file in order to generate the input file 22. However, the source device 10 does not necessarily comprise a video capture module 18 or a video editing module 19 and, therefore, the term "source device" is not intended to imply that the input file 22 is created on the source device 10. The input file 22 could instead be created by another device, such as a digital camera, and supplied to the source device 10 (e.g. by inserting a removable memory card containing the input file 22 into the source device 10).

A method 100 of encoding and sending video data will now be described with reference to FIG. 2. The method 100 is performed by the source device 10. A complementary method 400 that is performed by the destination device 30 is described below with reference to FIG. 4.

The method 100 begins at step 102, in which the video encoder 16 starts encoding the input file 22. The video encoder 16 is preferably instructed to start encoding the input file 22 by the controller 14. The video encoder 16 first reads the input file 22 (or a part thereof) from the memory 20. The video encoder 16 then creates a new file in the memory 20. The new file will eventually contain encoded video data and, therefore, is referred to herein as the encoded file 24. The video encoder 16 then generates a header and writes the header 26 to the encoded file 24. The header 26 comprises metadata that describes various properties of the encoded video data, such as its bit rate and resolution. The content of the header 26 is dependent upon the format of the encoded file 24. The metadata may be determined by parameters that are provided to the video encoder 16 by the controller 14 and/or by data contained in the input file 22. After the header 26 has been written, the video encoder 16 encodes the video data contained in the input file 22 and writes the resulting encoded video data to the encoded file 24. After all of the video data contained in the input file has been encoded and written to the encoded file 24, the video encoder 16 generates a new header and replaces the original header 26 of the encoded file 24 with the new header. The new header 26 comprises metadata that describes properties of the encoded video data that are only known after the whole of the input file 22 has been encoded. The new header 26 may also comprise some or all of the metadata that was written at the start of the encoding process.

The video encoder 16 encodes video data continuously until the input file 22 has been fully encoded. Thus, the video encoder 16 encodes the input file 22 at the same time as the encoded file 24 is being sent to the destination device 30 (as described below with reference to FIG. 3). Since the video encoder 16 operates continuously, data is continuously added to the encoded file 24 until the input file 22 has been fully encoded. Sending the encoded file 24 to the destination device 30 whilst its content is continuously changing gives rise to a technical problem of ensuring that the content of the encoded file 24 at the end of the encoding process is identical to the content of the target file 44 at the end of uploading process. This problem is solved by treating the input file 22 and the encoded file 24 as if they were composed of a plurality of portions, and by sending each portion of the encoded file 24 to the destination device 30 in a separate communication session. Each portion of the input file 22 corresponds to a respective portion of the encoded file 24. It should be noted that treating the input file 22 and the encoded file 24 as if they were composed of a plurality of portions does not require either file 22, 24 to be modified, nor does it require any of the plurality of portions to be stored separately at the source device 10. Treating the input file 22 and encoded file 24 as if they were composed of a plurality of portions can merely involve identifying a plurality of non-overlapping byte ranges, which collectively constitute the whole of the input file 22 or encoded file 24 respectively.

At step 104, the controller 14 determines that a first portion of the input file 22 has been encoded by the video encoder 16. For example, the controller 14 may determine that the first portion of the input file 22 has been encoded by monitoring the content of the encoded file 24. In this example, the controller 14 can read the encoded file 24 to determine the time within the video of the most-recently encoded video data (e.g. by reading a timestamp for the most-recently encoded data), and can also read a header of the input file 22 to determine the total video time of the input file 22. By comparing the total video time with the time of the most-recently encoded video data, the controller 14 can determine whether the first portion of the input file 22 has been encoded.

When the controller 14 has determined that the first portion of the input file 22 has been encoded, at step 106 the controller 14 triggers a process to send the first portion of the encoded file 24 from the source device 10 to the destination device 30. The process that is triggered at step 106 is referred to herein as the "sending process". However, the word "process" should be construed broadly, and it should be appreciated that the "sending process" could be implemented using a thread or any other suitable parallel processing methodology. An example of a method that is performed by the sending process is described in detail below, with reference to FIG. 3.

At step 108, the controller 14 decides whether the input file 22 has been fully encoded by the video encoder 16. This will not be the case when only the first portion of the input file 22 has been encoded, but may be the case when any subsequent portion of the input file 22 has been encoded. If the controller 14 determines that the input file 22 has not been fully encoded, the method proceeds to step 110. If the controller 14 determines that the input file 22 has been fully encoded, the method proceeds to step 112.

At step 110, the controller 14 determines that the second or subsequent portion of the input file 22 has been encoded by the video encoder 16. Similarly to step 104, the controller 14 may determine whether the second or subsequent portion of the input file 22 has been encoded by comparing the total video time with the time of the most-recently encoded video data. When the controller 14 determines that the second or subsequent portion of the input file 22 has been encoded by the video encoder 16, the method returns to step 106 and triggers a new sending process to send the most recently created portion of the encoded file 24 to the destination device 30. However, only one sending process is allowed to exist at any point in time. Thus, if a new sending process is triggered whilst a sending process is already in existence, the new sending process will be added to a queue. When the existing sending process terminates, the next sending process from the queue is executed. The queue is a First In First Out (FIFO) queue, so as to ensure that the portions of the encoded file 24 are sent to the destination device 30 in the order in which they were encoded, thereby ensuring that they are received by the destination device in the correct order. Allowing only one sending process to exist at any point in time also helps to ensure that the portions of the encoded file are received by the destination device 30 in the correct order. Provided that the sending process is allowed to use all of the available bandwidth between the source device 10 and the destination device 30, the use of only one sending process is not detrimental to the time taken to send the encoded file 24 to the destination device 30.

After returning to step 106 and triggering a new sending process, the method proceeds again to step 108. After a plurality of iterations through steps 106, 108 and 110, the input file 22 will be fully encoded, and a sufficient number of sending processes will have been triggered to cause the entire encoded file 24 to be sent to the destination device. The method then proceeds to step 112, in which the controller 14 waits for all of the portions of the encoded file 24 to be sent from the source device 10 to the destination device 30. All of the portions of the encoded file 24 will be sent when all of the sending processes triggered at step 106 have terminated normally. The method then proceeds to step 114.

At step 114, new header information is sent to the destination device 30. As explained above, the encoding processes of some video formats output data in a non-linear manner, whereby the header 26 of the encoded file 24 is written at the start of the encoding process and then replaced by a new header at the end of the encoding process. At the end of the encoding process (i.e. at the final iteration of decision step 108), the header 26 of the encoded file 24 that is stored on the source device 10 will be different from the header 46 of the target file 44. This difference occurs because the header 46 of the target file 44 is received by the destination device 30 before the header 26 of the encoded file 24 is replaced on the source device 10. Thus, the header 46 of the target file 44 does not contain the correct information, which can render the target file 44 unplayable. This problem is overcome by sending new header information from the source device 10 to the destination device 30, such that the destination device 30 can modify the header 46 of the target file 44 to include the new header information. The new header information may comprise the whole of the new header 26 of the encoded file 24, such that the original header 46 of the target file 44 can be completely replaced by the destination device 30. Alternatively, the new header information may comprise only the differences between the original header 26 of the encoded file 24 and the new header 26 of the encoded file 24, such that the original header 46 of the target file 44 can be updated by the destination device 30 to incorporate those differences. Thus, the destination device 30 modifies the header 46 of the target file 44 to include metadata that describes properties of the encoded video data that are only known after the whole of the input file 22 has been encoded. After the header 46 of the target file 44 has been modified, the header 46 contains the information needed for the target file 44 to be playable. An example implementation of step 114 is described in detail below, with reference to FIG. 5.

The sizes of each of the portions can be optimised to improve the efficiency of the method described herein. The size of the first portion can be relatively small in order to minimise the time taken before a sending process is first triggered at step 106. For example, the size of the first portion may be a small percentage of the size of the input file 22 (e.g. five percent), or may be a small number of bytes (e.g. one megabyte). If the second and subsequent portions are too small, then an inordinately large number of communication sessions will need to be established in order to send the whole of the encoded file 24 to the destination device 30; since each communication session takes a finite time to establish, establishing a very large number of communication sessions will result in unnecessary delays. On the other hand, if the second and subsequent portions are too large, then there is a risk that all preceding portions of the encoded file 24 will have been sent to the destination device 30 before the controller determines (at step 110) that the next portion of the encoded file 24 has been encoded; this will result in the communication link 50 being idle unnecessarily. Appropriate sizes for the first, second and subsequent portions can be chosen based upon the speed of the communication link 50 relative to the speed of the video encoder 16. The sizes of the first, second and subsequent portions need not be equal to each other.

Figure 3:
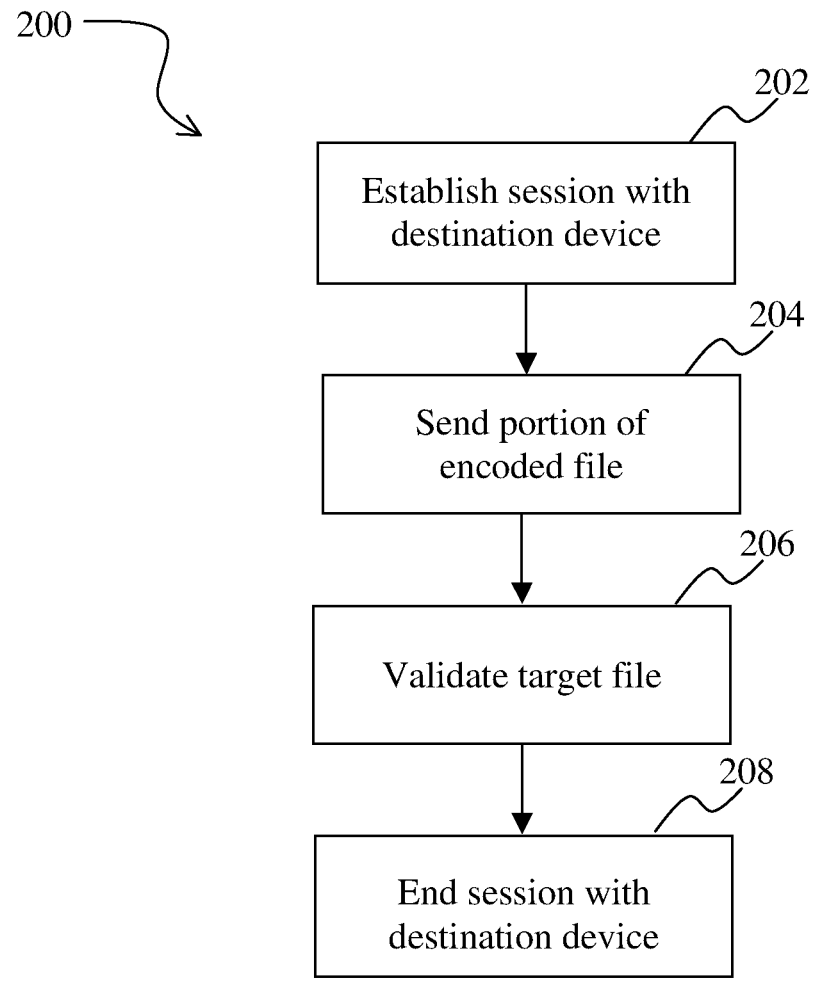
FIG. 3 is a flowchart of a method of sending a portion of a video data file.

An example of a method 200 for sending data will now be described with reference to FIG. 3. The method 200 is performed by the sending process that is triggered at step 106 of method 100. The sending process performs the method 200 in parallel with (i.e. at the same time as) the method 100, thereby allowing the encoded file 24 to be encoded and sent to the destination device 30 simultaneously.

Purely for the sake of illustration, the method 200 is described with reference to an example in which file transfer protocol (FTP) is used to send data from the source device 10 to the destination device 30. FTP is particularly advantageous when used in conjunction with method 100 because FTP provides an option to resume an earlier connection session. FTP's "resume" option allows a single file to be transferred using a plurality of sequential communication sessions, by allowing a later communication session to append data to a file that was transferred by an earlier communication session. This functionality allows the second and subsequent portions of the encoded file 24 to be appended to the previously-sent portions of the target file 44 and, advantageously, does not require a specialised application at the destination device 30 to combine each of the portions of the encoded file 24 that are sent separately to the destination device 20. Despite the advantages of FTP, it should be appreciated that other suitable communication protocols could be used to send data from the source device to the destination device. Preferably, the other suitable communication protocols comprise functionality to append data to a file that was transferred by an earlier communication session.

Method 200 begins at step 202, in which the source device 10 establishes a communication session with the destination device 30, via the communication link 50. More specifically, the communication interface 12 of the source device 10 connects to the communication interface 22 of the destination device 30 in order to allow data to be exchanged between the devices 10, 30.

In an example in which the method 200 uses FTP, step 202 comprises the following actions. Firstly, an FTP socket is opened at the source device 10. The source device 10 then opens an FTP session with the destination device 30, which may comprise the source device 10 providing authentication information (e.g. a user name and password) to the destination device 30. The source device 10 then provides the name of the target file 44 to the destination device 30, which may comprise providing the path of the target file 44 within the directory structure of the destination device 30. The destination device 30 validates the name of the target file 44 that is provided by the source device 10.

At step 204, the source device 10 sends a portion of the encoded file 24 to the destination device 30. If step 204 is performed by the first sending process, a new target file 44 is created at the destination device and the first portion of the encoded file 24 is stored in the new target file 44. If step 204 is performed by the second and subsequent sending processes, the second and subsequent portions of the encoded file 24 are appended to an existing target file 44. When the portion of the encoded file 24 has been sent to the destination device 30, the method 200 proceeds to step 206.

At step 206, the newly-received portion of the target file 44 is validated to ensure that it is identical to the portion of the encoded file 24 was sent from the source device 10. For example, the source device 10 calculates a checksum for the portion of the encoded file 24 and sends the checksum to the destination device 30. The destination device 30 calculates a checksum for the corresponding portion of the target file 44, and compares this with the checksum received from the source device 10. The destination device 30 then sends a message to the source device 10 to indicate whether the checksums are equal. If the message indicates that the checksums are equal, the method proceeds to step 208. If the message indicates that the checksums are not equal, error handling can be performed (for example, by returning to step 204 to resend the portion of the encoded file 24). The source device 10 and the destination device 30 may use the MD5 algorithm to calculate the respective checksums.

At step 208, the source device 10 closes the communication session with the destination device 30. In the example in which the method 200 uses FTP, the source device 10 closes the FTP socket in order to close the communication session.

Figure 4:
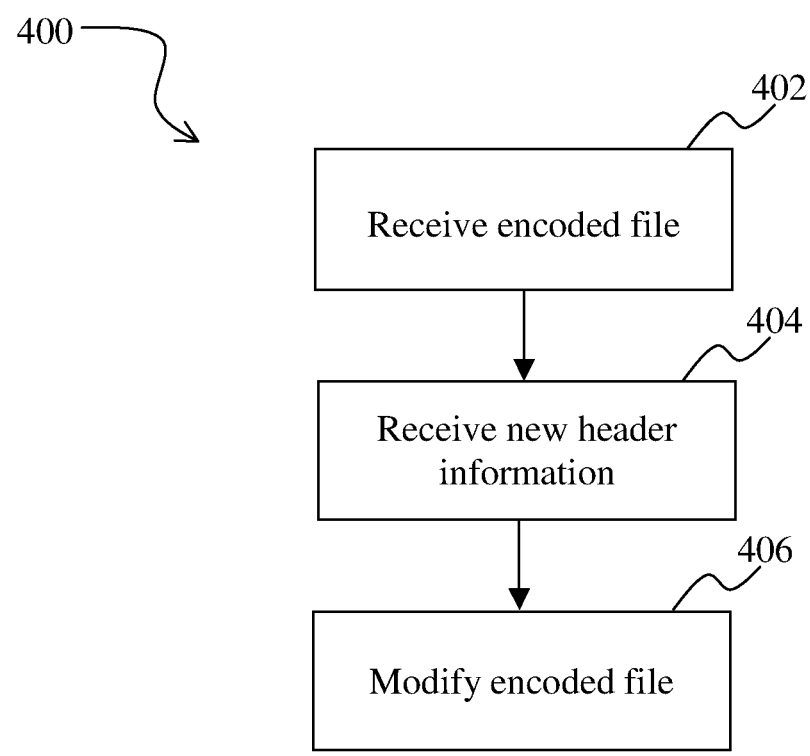
FIG. 4 is a flowchart of a method of receiving a video data file.

A method 400 for receiving video data will now be described with reference to FIG. 4. The method 400 is performed by the destination device 30, and complements the method 100 that is performed by the source device 10.

At step 402, the destination device 30 receives the encoded file 24 from the source device 10. The encoded file 24 is received as a plurality of portions. Upon receiving the first portion of the encoded file 24, the destination device creates the target file 44 in memory 40 and stores the first portion of the encoded file 24 in the target file 44. The first portion that is received by the destination device 30 may comprise the original header of the encoded file 24. The second and subsequent portions of the encoded file 24 are appended to the target file 44 when they are received. Each portion may be received in a separate communication session, as explained above in connection with FIG. 3. Step 402 may be performed using FTP or another suitable communication protocol that has the functionality to append data to a file that was received during an earlier communication session.

At step 404, the destination device 30 receives new header information from the source device 10. The new header information may comprise the whole of the new header 26 of the encoded file 24, or may comprise only the differences between the original header 26 of the encoded file 24 and the new header 26 of the encoded file 24.

At step 406, the destination device 30 modifies the target file 44 to include the new header information that was received at step 404. This may include modifying the original header 46 of the target file 46, or may include completely replacing the original header 46 with a new header. An example implementation of step 406 is described below with reference to FIG. 5.

Figure 5:
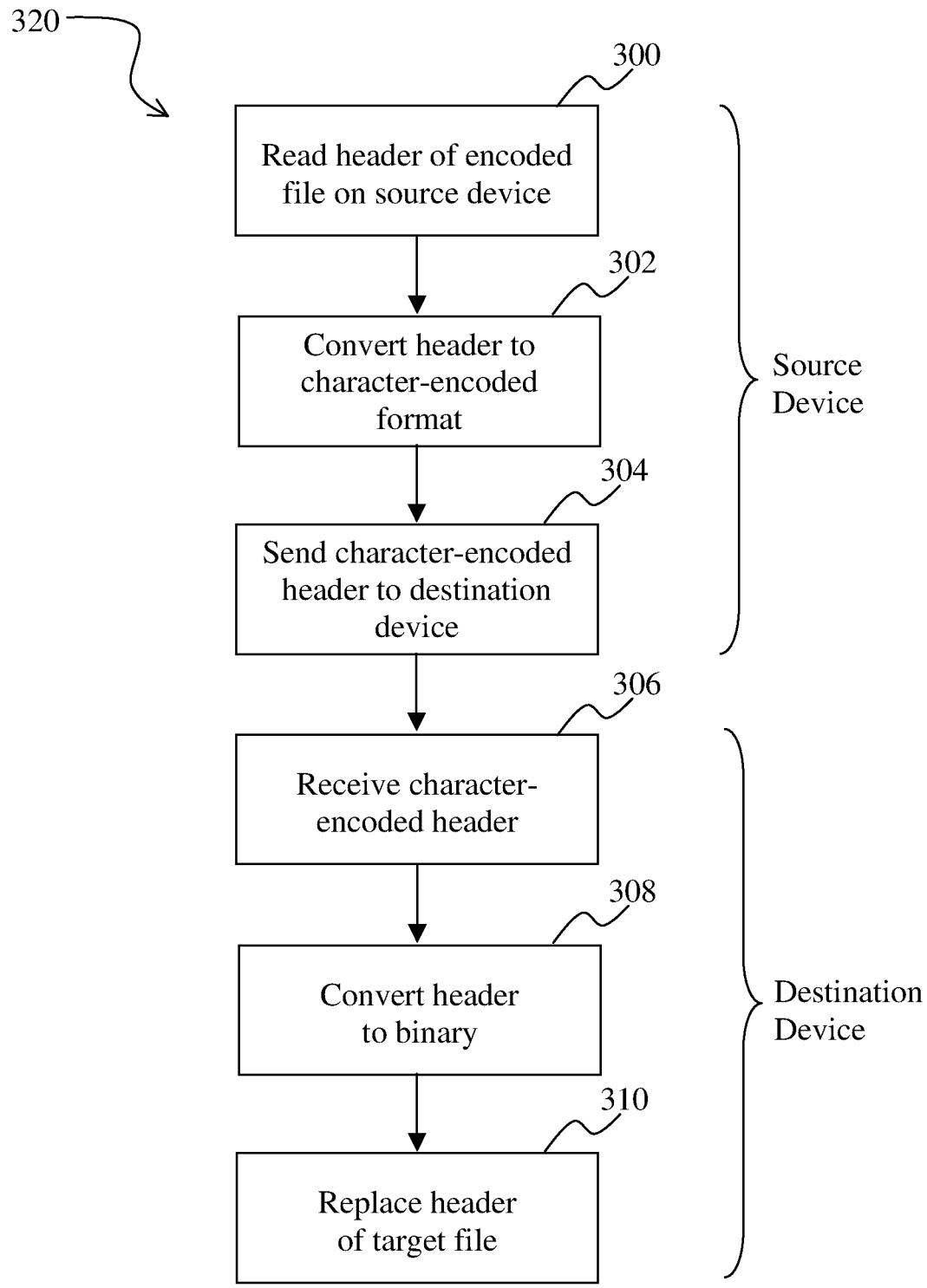
FIG. 5 is a flowchart of a method of modifying the header of a video data file.

An example of a method 320 for modifying the header 46 of the target file 44 on the destination device 30 will now be described with reference to FIG. 5. Purely for the sake of illustration, the method 320 is described with reference to an example in which hypertext transfer protocol (HTTP) is used to send a new header from the source device 10 to the destination device 30. It will be appreciated that other suitable communication protocols could be used.

The method 320 starts at step 300, in which the controller 14 of the source device 10 reads the header 26 of the encoded file 24 from the memory 20 of the source device 10. The header 26 is in a binary format when it is read by the controller 14. At step 302, the controller 14 converts the header 26 to a character-encoded format. For example, the character-encoded format can be ISO 8859. It is necessary for the header 26 to be converted to a character-encoded format in order that it can be sent using HTTP, which is a character-based protocol. Many programming languages comprise functionality for converting binary data to character-encoded data and, therefore, the way in which the conversion is performed need not be described in detail. At step 304, the source device 10 sends the character-encoded header to the destination device 30. More specifically, the communication interface 12 of the source device 10 sends the character-encoded header to the communication interface 32 of the destination device 30 via the communication link 50. Steps 300, 302 and 304 are all performed at the source device 10 and generally correspond to step 114 of FIG. 2.

At step 306, the destination device 30 receives the character-encoded header from the source device 10. At step 308, the controller 34 of the destination device 30 converts the character-encoded header 26 to the same binary format as the target file 44. Many programming languages comprise functionality for converting character-encoded data to binary data and, therefore, the way in which the conversion is performed need not be described in detail. At step 310, the controller 34 of the destination device 30 replaces the header of the target file 44 with the binary header that was created at step 308. After step 310 has been completed, the encoded file 24 on the source device 10 is identical to the target file 44 on the destination device 30. Steps 306, 308 and 310 are all performed at the destination device 30, and generally correspond to steps 404 and 406 of FIG. 4.

Figure 2:
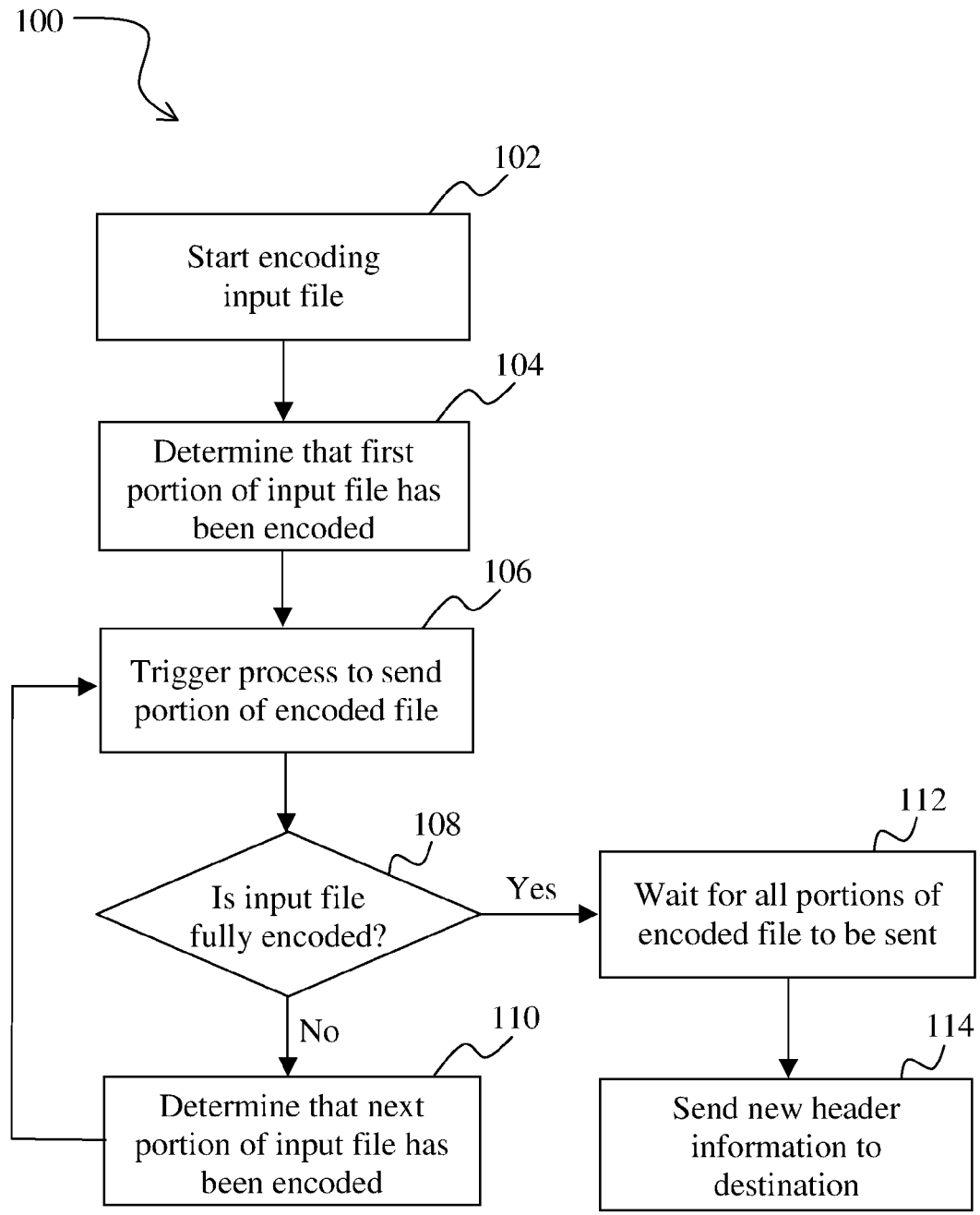
FIG. 2 is a flowchart of a method of encoding and sending a video data file.

FIG. 6 is a timing diagram to illustrate the method 100 shown in FIG. 2. For the sake of simplicity, the timing diagram assumes that the input file 22 and the encoded file 24 comprise only three portions, and all portions are assumed to take the same amount of time to encode. Clearly, the input file 22 and the encoded file 24 may comprise more portions (or even only two portions), and each portion may take a different time to encode.

At time t0, the video encoder 16 starts to encode the input file (step 102 of FIG. 2) by creating the original header 26 of the encoded file 24. At time t1, the video encoder 16 finishes creating the original header 26 and begins to encode the first portion of the input file 22. At time t2, the first portion of the input file 22 has been encoded (step 104 of FIG. 2) and a first sending process is triggered (step 106 of FIG. 2). Since no other sending processes are in existence, the first sending process can start to execute immediately at time t2, thereby sending the first portion of the encoded file 24 to the destination device 30. The first sending process may send the original header to the destination device 30 as part of the first portion of the encoded file 24. The video encoder 16 also begins to encode the second portion of the input file 22 at time t2.

At time t3, the video encoder 16 finishes encoding the second portion of the input file 22 (step 110 of FIG. 2) and a second sending process is triggered (step 106 of FIG. 2). Since the first sending process is still executing at time t3, the second sending process is queued. The video encoder 16 also begins to encode the third portion of the input file 22 at time t3.

At time t4, the first sending process finishes sending the first portion of the encoded file 24 and terminates. The termination of the first sending process allows the second sending process to start executing at time t4, thereby sending the second portion of the encoded file 24 to the destination device 30.

At time t5, the video encoder 16 finishes encoding the third portion of the input file 22 (step 110 of FIG. 2) and a third sending process is triggered (step 106 of FIG. 2). Since the second sending process is still executing at time t5, the third sending process is queued. The video encoder 16 also begins to create a new header 26 for the encoded file at step t5. At time t6, the video encoder 16 finishes creating the new header.

At time t7, the second sending process finishes sending the second portion of the encoded file 24 and terminates. The termination of the second sending process allows the third sending process to start executing at time t7, thereby sending the third portion of the encoded file 24 to the destination device 30.

At time t8, the third sending process finishes sending the third portion of the encoded file 24 and terminates. All portions of the encoded file 24 have now been sent to the destination device 30 (step 112 of FIG. 2). At time t8, the source device 10 begins to send new header information to the destination device 30. The destination device 30 modifies the header of the target file 44 to include the new header information. At time t9, the header 46 of the target file 44 is identical to that of the encoded file 24, and the method ends.

FIG. 6 illustrates the technical advantage of the method and apparatus described herein. By the sending the encoded file 24 to the destination device 30 at the same time as the input file 22 is being encoded, and by sending new header information for the target file 44 after the sending of the encoded file 24 to the destination device 30 has finished, the overall time taken to encode and send the encoded file 24 is reduced. In the absence of the method described herein, it would be necessary to wait until the new header had been created at time t6 before the sending the encoded file 24 to the destination device 30 could commence. However, the method described herein allows sending the encoded file 24 to the destination device 30 to commence at time t2, thereby considerably reducing the time taken to encode and send the encoded file 24.

In an example implementation of the present disclosure, the source device 10 comprises a computer, wherein the computer comprises a web browser, a client application and video encoding software. The client application comprises instructions that, when executed by the computer, cause the computer to perform the methods described above and illustrated in FIGS. 2 to 5. The computer may be a personal computer, a tablet computer, a smartphone or a personal digital assistant. The client application may be a Java™ application, which executes within a Java™ runtime environment provided on the computer, whereby a user can interact with the client application using the web browser. The video encoding software may be FFmpeg (available from http://ffmpeg.org), but other suitable video encoding software could also be used. A Java™-based implementation has the advantage of avoiding the need to install dedicated software on the computer in order to encode and send data efficiently.

In this example implementation, the destination device 30 comprises a computer, wherein the computer comprises web server software, a server application (e.g. a PHP script for execution by the web server) and FTP server software. The FTP server software is operable to receive each of the portions of the encoded file 24. The server application comprises instructions that, when executed by the computer, are operable to receive a character-encoded header and to replace the header 46 of the target file 44 with the character-encoded header, as described above and illustrated by steps 306 to 310 of FIG. 5.

Thus, the present disclosure can be implemented as program code for execution by one or more computers. The methods disclosed herein can be performed by instructions stored on a processor-readable medium. The processor-readable medium may be: a read-only memory (including a PROM, EPROM or EEPROM); random access memory; a flash memory; an electrical, electromagnetic or optical signal; a magnetic, optical or magneto-optical storage medium; one or more registers of a processor; or any other type of processor-readable medium.

In alternative embodiments, the present disclosure can be implemented as control logic in hardware, firmware, software or any combination thereof. The apparatus may be implemented by dedicated hardware, such as one or more application-specific integrated circuits (ASICs) or appropriately connected discrete logic gates. A suitable hardware description language can be used to implement the method described herein with dedicated hardware.

It is envisaged that the present disclosure could also be implemented within a digital video camera. Such a digital video camera comprises a general purpose processor with sufficient processing power to perform video encoding or, more preferably, dedicated video encoding hardware. The digital video camera further comprises a communication interface 12, preferably a wireless communication interface such as a cellular data interface or an IEEE 802.11 interface. The digital video camera further comprises software or firmware to perform the methods described above with reference to FIGS. 2 to 5. Implementing the present disclosure within a digital video camera in this manner has the advantage that an encoded file 24 can be immediately uploaded to a destination device 30 (such as a video sharing website) without the need for the input file 22 to be transferred from the camera to an intermediary device. This can further reduce the time taken to distribute a video file.

It will be understood that the invention has been described above purely by way of example, and that modifications of detail can be made within the scope of invention.

The invention claimed is:

1. A method of encoding and communicating video data, comprising:
   encoding a video data file to create an encoded video data file, wherein the video data is converted from one format to another encoded format, and wherein encoding comprises:
      generating an original header, the original header comprising metadata that describes properties of the encoded video data that are dependent upon the format of the encoded video data file,
      writing the original header to the encoded video data file,
      subsequent to generating the original header, encoding the video data,
      writing encoded video data to the encoded video data file,
      generating a new header, the new header comprising metadata that describes properties of the encoded video data that are known only after the whole of the video data file has been encoded, and
      replacing the original header of the encoded video data file with the new header;
   sending the encoded video data file to a destination, wherein a portion of the encoded video data file is sent to the destination at the same time as the video data file is being encoded, wherein the portion of the encoded video data file includes the original header; and
   sending the new header to the destination when sending the encoded video data file to the destination is complete, wherein sending the new header causes the destination to modify a copy of the encoded video data file stored at the destination by replacing the original header with the new header.

2. A method in accordance with claim 1, wherein sending the new header to the destination comprises:
   converting the new header to a character-encoded format to create a character-encoded header; and
   sending the character-encoded header to the destination.

3. A method in accordance with claim 2, further comprising:
   receiving the character-encoded header at the destination;
   creating a binary header by converting the character-encoded header to binary; and
   replacing a header of the encoded video data file at the destination with the binary header.

4. A method in accordance with claim 1, wherein the encoded video data file comprises a plurality of portions, and wherein sending the encoded video data file comprises sending each portion of the encoded video data file to the destination in a separate communication session.

5. A method in accordance with claim 4, wherein each communication session uses a communication protocol having functionality to append data to a file that was sent during an earlier communication session.

6. A method in accordance with claim 1, wherein sending the encoded video data file comprises:
   determining that a portion of the video data file has been encoded; and
   triggering a process to send a corresponding portion of the encoded video data file to the destination.

7. A method of communicating video data, comprising:
   receiving a portion of an encoded video data file comprising an original header, the original header comprising metadata that describes properties of the encoded video data that are dependent upon the format of the encoded video data file, wherein the portion is received from an encoder at the same time as the video data file is being encoded by the encoder, and wherein the portion includes the original header;
   receiving a new header for the encoded video data file when the encoded video data file has been completely received, the new header comprising metadata that describes properties of the encoded video data that are known only after the whole of the video data file has been encoded; and
   responsive to receiving the new header, modifying the received encoded video data file by replacing the original header with the new header.

8. A method in accordance with claim 7, wherein receiving the new header comprises receiving a character-encoded header.

9. A method in accordance with claim 8, wherein modifying the encoded video data file comprises:
   creating a binary header by converting the character-encoded header to binary; and
   replacing a header of the encoded video data file with the binary header.

10. A method in accordance with claim 7, wherein the encoded video data file comprises a plurality of portions, and wherein receiving the encoded video data file comprises receiving each portion of the encoded video data file in a separate communication session.

11. A method in accordance with claim 10, wherein each communication session uses a communication protocol having functionality to append data to a file that was received during an earlier communication session.

12. A method in accordance with claim 10, wherein receiving the encoded video data file comprises appending a received portion of the encoded video data file to a portion of the encoded video data file that was received during an earlier communication session.

13. A non-transitory processor-readable medium comprising instructions which, when executed by a processor, cause the processor to perform a method in accordance with claim 1.

14. An apparatus for encoding and communicating video data, comprising one or more processors which execute:
   an encoder configured to encode a video data file to create an encoded video data file, wherein the video data is converted from one format to another encoded format, and wherein the encoder is further configured to:
      generate an original header, the original header comprising metadata that describes properties of the encoded video data that are dependent upon the format of the encoded video data file,
      write the original header to the encoded video data file,
      subsequent to generating the original header, encode the video data,
      write encoded video data to the encoded video data file,
      generate a new header comprising new header information, the new header information comprising metadata that describes properties of the encoded video data that are known only after the whole of the video data file has been encoded, and
      replace the original header of the encoded video data file with the new header;
   a controller configured to:
      send the encoded video data file to a destination, wherein a portion of the encoded video data file is sent to the destination at the same time as the encoder is encoding the video data file, wherein the portion of the encoded video data file includes the original header; and
      send the new header to the destination when sending the encoded video data file to the destination has finished, and
      cause the destination to modify a copy of the encoded video data file stored at the destination by replacing the original header with the new header.

15. An apparatus in accordance with claim 14, further comprising:
   a converter configured to convert the new header to a character-encoded format to create a character-encoded header;
   wherein the controller is configured to send the character-encoded header to the destination.

16. An apparatus in accordance with claim 15, further comprising a destination device unit configured to:
   receive the character-encoded header at the destination;
   create a binary header by converting the character-encoded header to binary; and
   replace a header of the encoded video data file at the destination with the binary header.

17. An apparatus in accordance with claim 14, wherein the encoded video data file comprises a plurality of portions, and wherein the controller is further configured to send each portion of the encoded video data file to the destination in a separate communication session.

18. An apparatus in accordance with claim 17, wherein each communication session uses a communication protocol having functionality to append data to a file that was sent during an earlier communication session.

19. An apparatus in accordance claim 14, wherein the controller is further configured to:
   determine that a portion of the video data file has been encoded; and
   trigger a process to send a corresponding portion of the encoded video data file to the destination.

20. An apparatus for communicating video data, comprising at least one processor which executes:
   a controller configured to:
      receive a portion of an encoded video data file, the encoded video data file comprising an original header, the original header comprising metadata that describes properties of the encoded video data that are dependent upon the format of the encoded video data file, wherein the portion is received from an encoder at the same time as the video data file is being encoded by the encoder, and wherein the portion includes the original header;
      receive a new header for the encoded video data file when the encoded video data file has been completely received, the new header comprising metadata that describes properties of the encoded video data that are known only after the whole of the video data file has been encoded; and responsive to receiving the new header, modify the received encoded video data file by replacing the original header with the new header.

21. An apparatus in accordance with claim 20, wherein the controller is configured to receive a character-encoded header.

22. An apparatus in accordance with claim 21, wherein the controller is further configured to:
create a binary header by converting the character-encoded header to binary; and
replace a header of the encoded video data file with the binary header.

23. An apparatus in accordance with claim 20, wherein the encoded video data file comprises a plurality of portions, and wherein the controller is configured to receive each portion of the encoded video data file in a separate communication session.

24. An apparatus in accordance with claim 23, wherein each communication session uses a communication protocol having functionality to append data to a file that was received during an earlier communication session.

25. An apparatus in accordance with claim 23, wherein the controller is further configured to append a received portion of the encoded video data file to a portion of the encoded video data file that was received during an earlier communication session.

26. The method of claim 1, wherein sending the new header comprises remotely invoking code at the destination that causes the destination to modify a copy of the encoded video data file stored at the destination by replacing the original header with the new header.

27. The apparatus of claim 14, wherein the controller is configured to remotely invoke code at the destination that causes the destination to modify a copy of the encoded video data file stored at the destination by replacing the original header with the new header.

28. The apparatus of claim 20, wherein the controller is configured to receive an original header comprising metadata that describes properties of the encoded video data, and to receive a new header comprising metadata that describes properties of the encoded video data that are known only after the whole of the video data file has been encoded.

29. The method of claim 1, wherein the encoded video data file comprises a plurality of portions, and wherein sending the encoded video data file comprises sending each portion of the encoded video data file to the destination in a separate communication.

* * * * *